United States Patent [19]
Fay et al.

[11] Patent Number: 5,466,155
[45] Date of Patent: Nov. 14, 1995

[54] LAPTOP BRAILLE SLATE

[76] Inventors: Susan K. Fay; Frank J. Fay, both of 966 S. Garfield St.; C. Don Weston, 120 N. Dudley St., all of Macomb, Ill. 61455

[21] Appl. No.: 208,368

[22] Filed: Mar. 10, 1994

[51] Int. Cl.[6] ................................. G09B 21/02
[52] U.S. Cl. ...................................... 434/115
[58] Field of Search ..................... 434/115, 113, 434/112

[56]     References Cited

U.S. PATENT DOCUMENTS

| | | | |
|---|---|---|---|
| 2,850,812 | 9/1958 | Mannheimer | 434/115 |
| 3,340,625 | 9/1967 | Supitilov | 434/115 |
| 3,370,530 | 2/1968 | Henderson | 434/115 X |
| 3,598,042 | 8/1971 | Boyd . | |
| 4,108,066 | 8/1978 | Anderson . | |
| 4,277,239 | 7/1981 | Genis . | |
| 4,573,926 | 3/1986 | Okada . | |
| 4,859,094 | 8/1989 | Okada . | |

FOREIGN PATENT DOCUMENTS

| | | | |
|---|---|---|---|
| 2607614 | 6/1988 | France | 434/115 |
| 0209059 | 4/1909 | Germany | 434/115 |

*Primary Examiner*—Gene Mancene
*Assistant Examiner*—Jeffrey A. Smith

[57]     ABSTRACT

A page size slate structure includes first and second plates hingedly mounted relative to one another permitting a face-to-face relationship in a continuous communication, with the first plate having a matrix of openings, and the second plate having a matrix of cells, each of said cells having six recesses arranged in a symmetrical pattern, with each of the recesses being positioned for reception within a relief gap in a side wall of the first plate openings permitting the imparting of braille patterns upon a sheet material secured between the first and second plates. A pointed object such as a conventional braille stylus is employed to effect projection of a marking onto the paper.

6 Claims, 4 Drawing Sheets

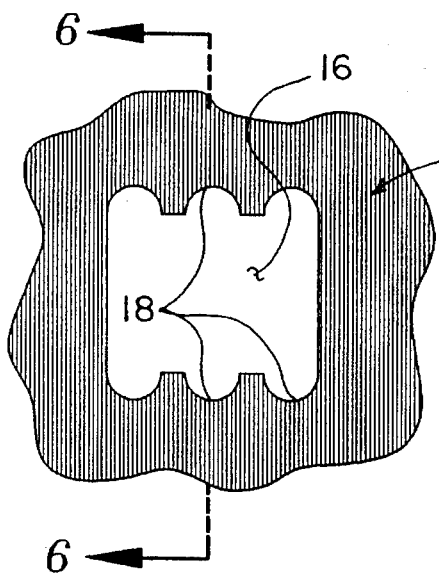
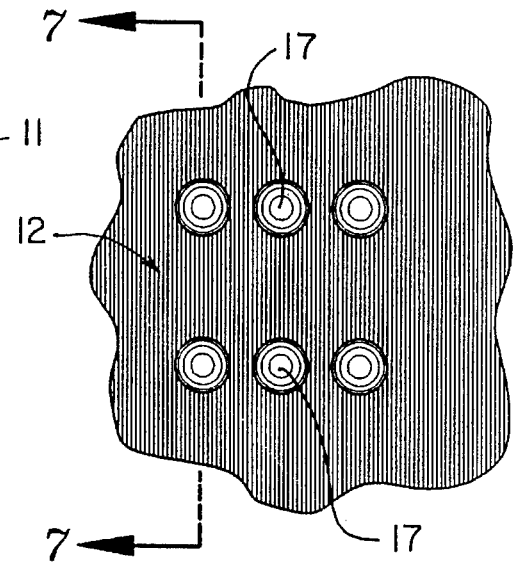
FIG. 4
FIG. 5
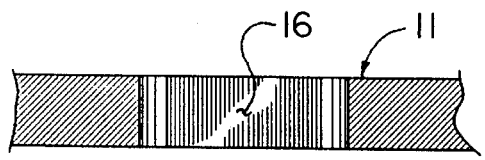
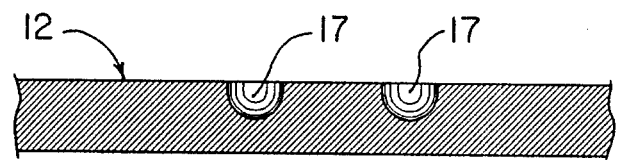
FIG. 6
FIG. 7
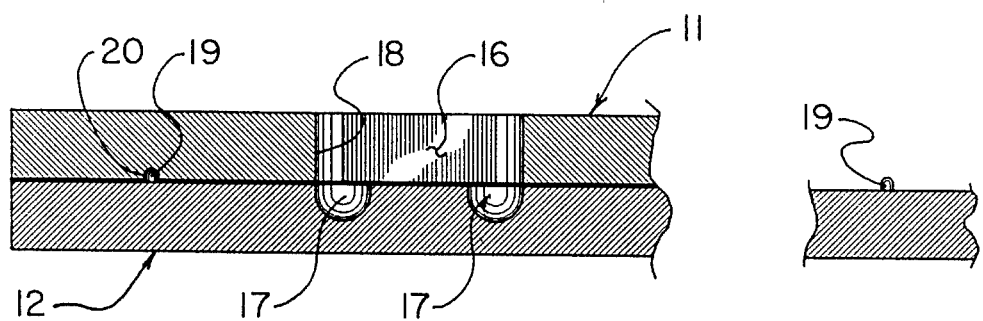
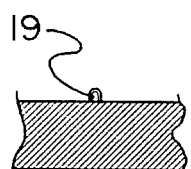
FIG. 8
FIG. 9

LAPTOP BRAILLE SLATE

BACKGROUND OF THE INVENTION

1. Field of the Invention

The field of invention relates to braille apparatus, and more particularly pertains to a new laptop braille slate arranged to secure and enclose a web between first and second plates to permit the ease of directing braille markings into the web or other material.

2. Description of the Prior Art

Braille apparatus of various types have been utilized in the prior art, wherein U.S. Pat. No. 4,277,239 sets forth a braille structure wherein a container includes cooperating hinge plate structure to position recesses within openings for the marking of a web between the plates. U.S. Pat. No. 4,859,094 indicates the use of a sphere as it is arranged for projection into underlying cavities to effect a printing plate structure for braille reproduction.

The instant invention attempts to overcome deficiencies of the prior art by employing cooperating first and second plates formed of rigid construction to secure a web of sheet material therebetween in a secured relationship to permit the imparting of braille patterns of openings into the web.

SUMMARY OF THE INVENTION

In view of the disadvantages inherent in the known types of braille printing apparatus now present in the prior art, the present invention provides a laptop braille slate wherein the same is arranged to enclose a web of sheet material to permit the imparting of a pattern of braille openings into the web for communication. As such, the general purpose of the present invention, which will be described subsequently in greater detail, is to provide a new laptop braille slate apparatus and method which has many of the advantages of the prior art listed heretofore and many novel features that result in a laptop braille slate apparatus which is not anticipated, rendered obvious, suggested, or even implied by any of the prior art, either alone or in any combination thereof.

To attain this, the present invention provides a page size slate structure which includes first and second plates hingedly mounted relative to one another permitting a face-to-face relationship in a continuous communication, with the first plates having a matrix of openings, and the second plate having a matrix of cells, each of said cells having six recesses arranged in a symmetrical pattern, with each of the recesses being positioned for reception within a relief gap in a side wall of the first plate openings permitting the imparting of braille patterns upon a sheet material secured between the first and second plates. A pointed object such as a conventional braille stylus is employed to effect projection of a marking onto the web.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new laptop braille slate apparatus and method which has many of the advantages of the prior art listed heretofore and many novel features that result in a laptop braille slate apparatus which is not anticipated, rendered obvious, suggested, or even implied by any of the prior art, either alone or in any combination thereof.

It is another object of the present invention to provide a new laptop braille slate which may be easily and efficiently manufactured and marketed.

It is a further object of the present invention to provide a new laptop braille slate which is of a durable and reliable construction.

An even further object of the present invention is to provide a new laptop braille slate which is susceptible of a low cost of manufacture with regard to both materials and labor, and which accordingly is then susceptible of low prices of sale to the consuming public, thereby making such laptop braille slates economically available to the buying public.

Still yet another object of the present invention is to provide a new laptop braille slate which provides in the apparatuses and methods of the prior art some of the advantages thereof, while simultaneously overcoming some of the disadvantages normally associated therewith.

Even yet another object of the present invention is to provide a new laptop braille slate which provides a page size slate structure including first and second plates hingedly mounted relative to one another permitting a face-to-face relationship in a continuous communication, with the first plate having a matrix of openings, and the second plate having a matrix of cells, each of said cells having six recesses arranged in a symmetrical pattern, with each of the recesses being positioned for reception within a relief gap in a side wall of the first plate openings permitting the imparting of braille patterns upon a web of sheet material secured between the first and second plates.

Even still yet another object of the present invention is to provide a new laptop braille slate in which a pointed object such as a conventional braille stylus is employed to effect projection of a marking onto the web.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an enlarged orthographic view of section 4 as set forth in FIG. 2.

FIG. 5 is an enlarged orthographic view of section 5 as set forth in FIG. 3.

FIG. 6 is an orthographic view, taken along the lines 6—6 of FIG. 4 in the direction indicated by the arrows.

FIG. 7 is an orthographic view, taken along the lines 7—7 of FIG. 5 in the direction indicated by the arrows.

FIG. 8 is an enlarged orthographic cross-sectional illustration of the first and second plates in contiguous communication relative to one another.

FIG. 9 is an enlarged orthographic view of section 9 as set forth in FIG. 3.

DESCRIPTION OF THE PREFERRED EMBODIMENT

Figure 1:
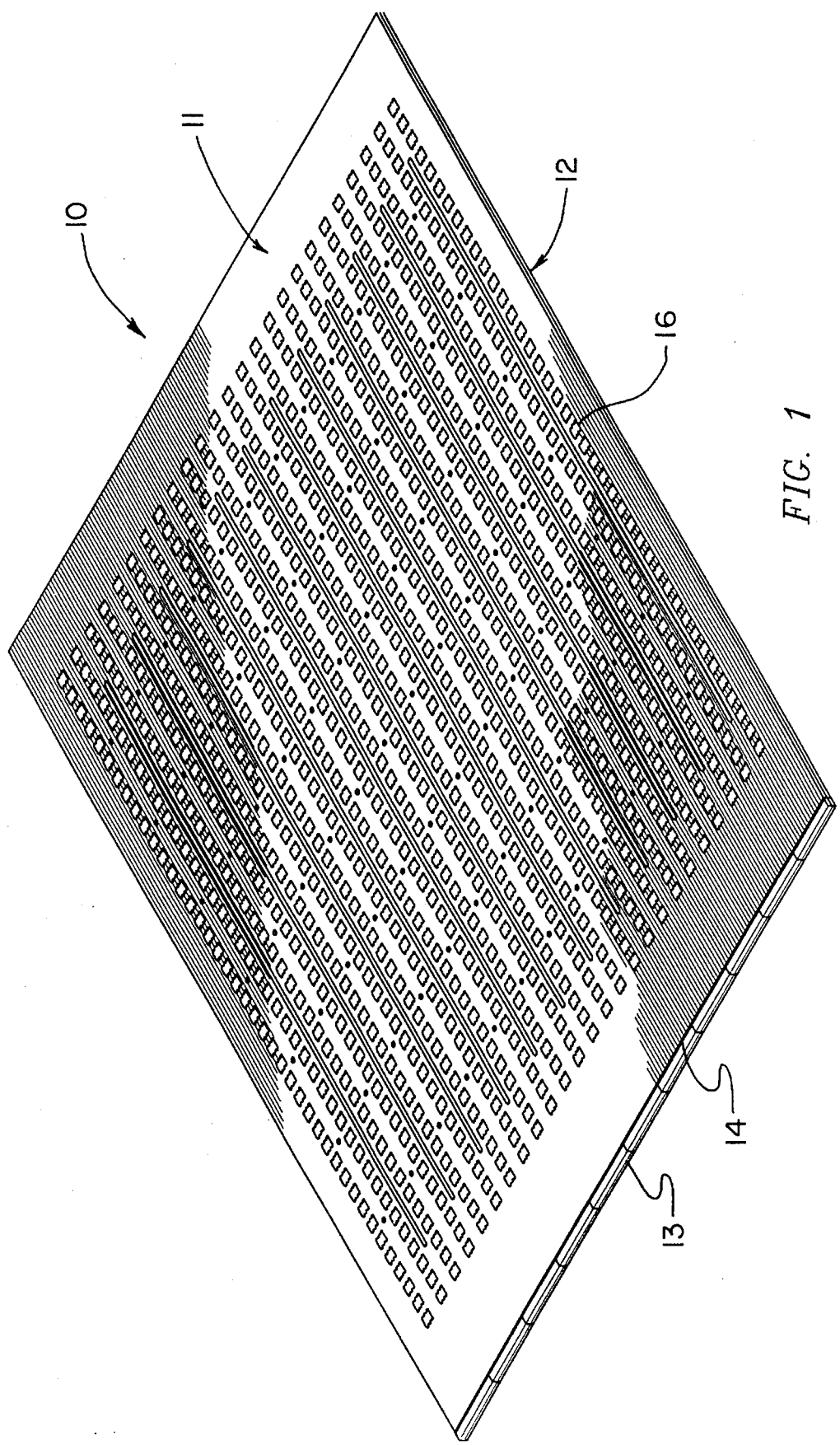
FIG. 1 is an isometric illustration of the invention.

With reference now to the drawings, and in particular to FIGS. 1–9 thereof, a new laptop braille slate embodying the principles and concepts of the present invention and generally designated by the reference numeral 10 will be described.

More specifically, the laptop braille slate 10 of the instant invention comprises a first and second rigid plates 11 and 12 arranged for pivotal movement relative to one another. The first and second plates 11 and 12 are arranged for spacing relative to one another to receive a web of sheet material therebetween in a first position and arranged for contiguous communication in a coextensive relationship relative to one another in a second position, such as indicated in FIG. 8 to capture such web therebetween. To facilitate such pivotal movement, a first plate first end 14 is coextensive with a second plate first end 15, with a hinge 13 mounted at the first and second plates first ends to accommodate the pivotal relationship as noted above.

Figure 2:
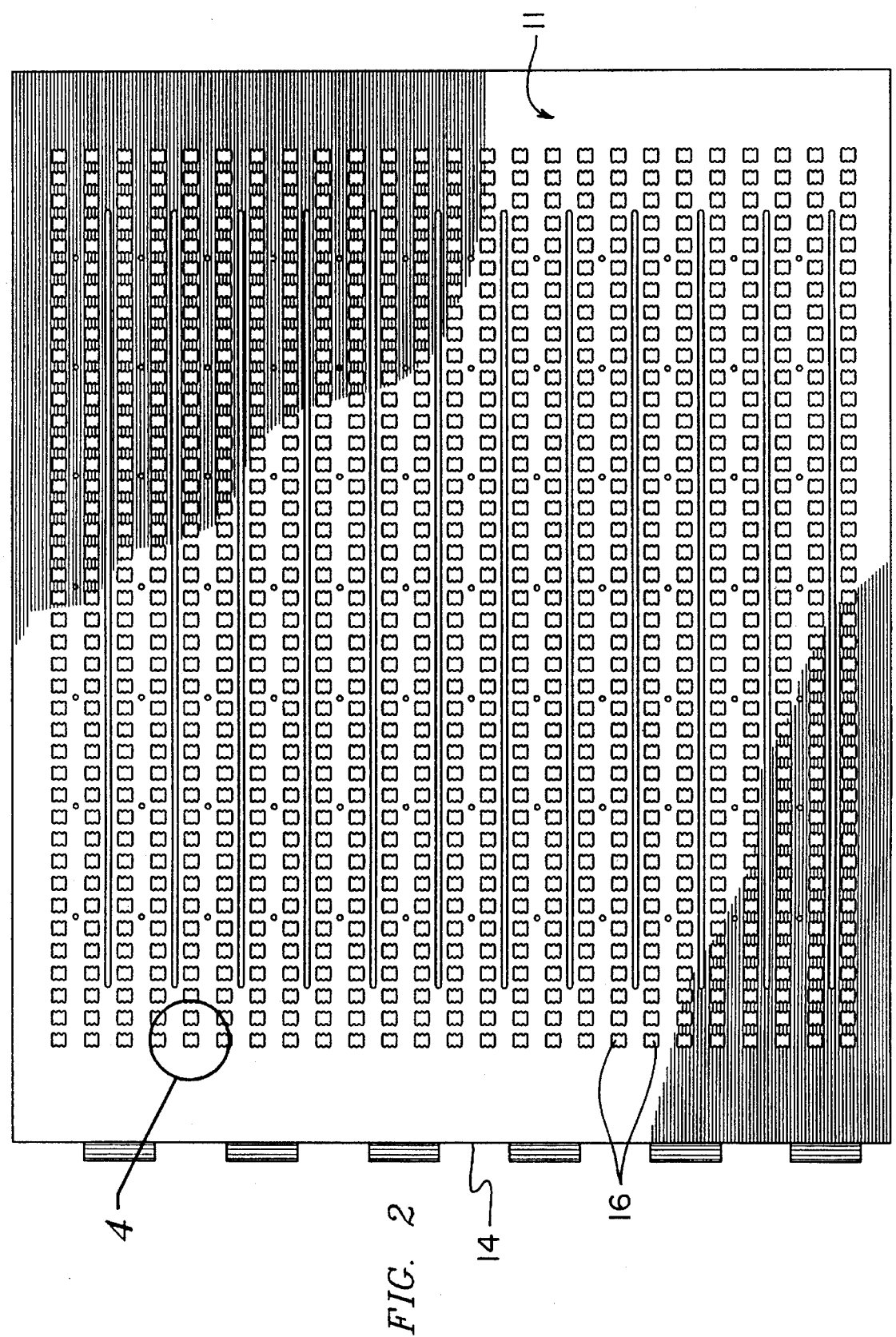
FIG. 2 is an orthographic top view of the first plate.
Figure 3:
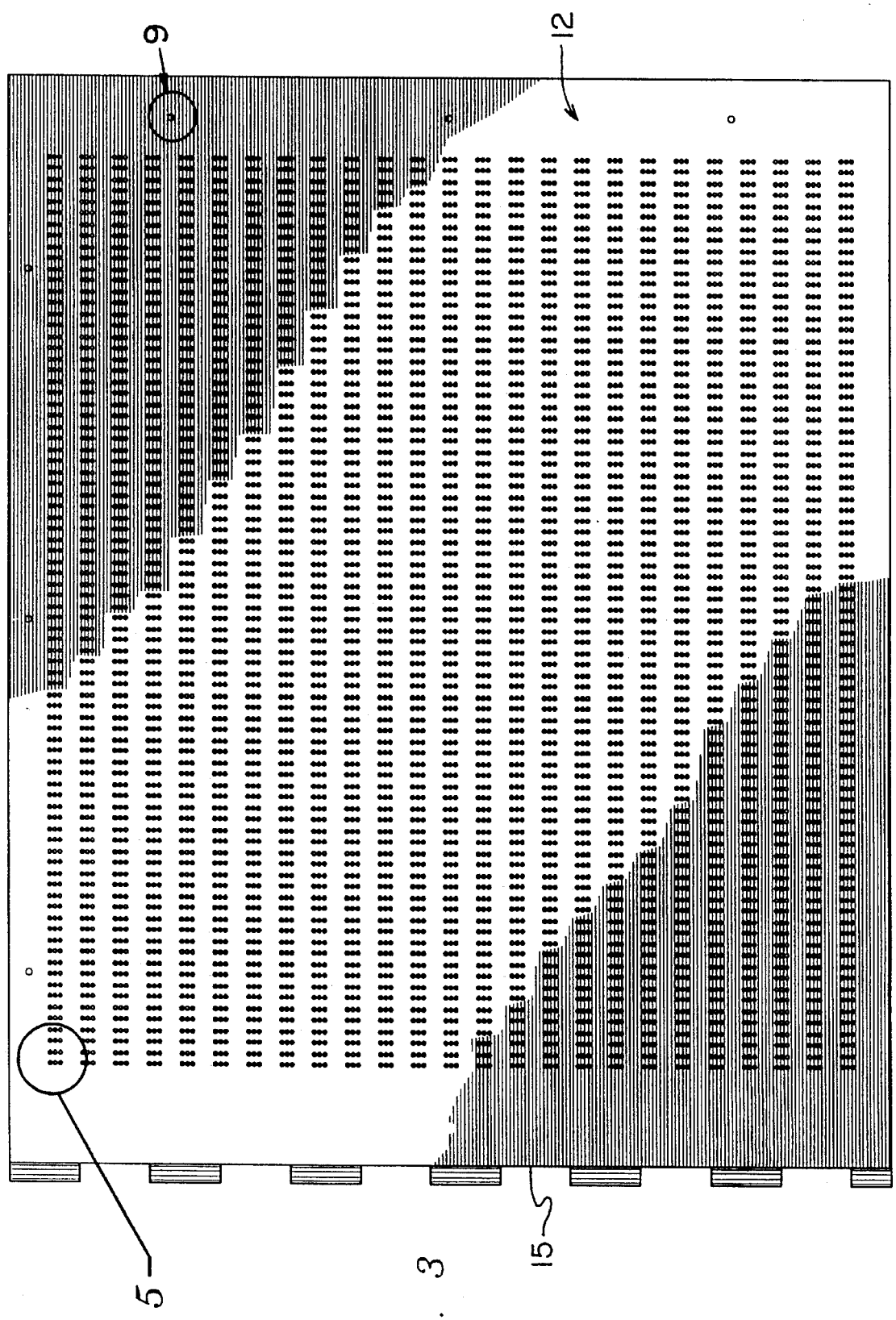
FIG. 3 is an orthographic top view of the second plate structure.

As best illustrated in FIGS. 2, 4, and 6, a matrix of openings 16 is directed through the first plate 11, with each of the matrix of openings including spaced side walls and spaced end walls defining rows and columns of such openings in a rectilinear array as indicated. A matrix of cells 17 is directed into the second plate top surface in a facing relationship relative to the first plate, such that each of the cells includes six recesses. Each of said recesses is received below a relief gap 18 in a respective side wall of a respective opening 16, as shown in FIG. 4. In this manner, a suitably pointed tool such as a conventional braille stylus may be received into an associated cell, thereby deforming a web secured between the first and second plates.

To further enhance securement of such a web, a plurality of projections 19 are fixedly mounted within the top surface of the second plate and cooperate with an associated projection receiving socket 20 in a bottom surface of the first plate to thereby secure such a web therebetween. Preferably, projections 18 and their corresponding sockets are located in a spaced manner along the right hand margin of the slate as viewed in FIG. 3. Additional cooperating pairs of projections and sockets 18 and 20 may be placed in a spaced row along the top margin of the slate to assure that the web or braille paper inserted between the plates of the slate is easily placed in a correct and desired registration position, i.e. with the top and right side edges of the web being parallel, respectively, to the top and right side edges of the slate.

It should be noted that the first and second plates of a complementary configuration are typically of a dimension greater than eleven inches by eleven and one-half inches to secure and position entire sheets of conventional braille material between the first and second plates.

Referring specifically now to FIG. 8 of the drawings, it can be shown that the relief gaps 18 of each opening 16 are oriented so as to extend in aligned spaced and parallel columns of three relief gaps within each column and to extend in aligned spaced and parallel rows of two relief gaps within each row. The relief gaps 18 are also each shaped so as to define an unlabeled semi-circular edge extending about a portion of a periphery of the respective opening 16. Similarly, it can be shown that the cell recesses of each individual cell of the matrix of cells 17 are oriented so as to extend in aligned spaced and parallel columns of three cell recesses within each column and to extend in aligned spaced and parallel rows of two cell recesses within each row. The cell recesses are also shaped so as to define a circular upper edge, wherein the semi-circular edge of each relief gap 18 is aligned with and positioned directly above a portion of an arc of the circular upper edge of a corresponding one of the cell recesses when the slate 10 is closed as shown in FIG. 1 of the drawings. With continuing reference to FIG. 8, it can be shown that the relief gaps are each semi-cylindrical in shape and include an unlabeled semi-cylindrical interior side wall extending substantially orthogonally between upper and lower surfaces of the first plate permitting ease of guidance of a pointed object into each of the cell recess.

The braille slate 10 allows a user to produce an entire page of braille writing in which the lines are straight and aligned. Further, the process of generating braille writing is more efficiently accomplished as the need for realigning the slate during production of the page is eliminated. Lastly, the slate provides a hard surface against which braille writing may be accomplished upon a user's lap or other soft surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A laptop braille slate comprising:

a first plate having a first plate first end spaced from a first plate second end, said first plate having a matrix of openings directed through the first plate, with each of the openings of the matrix including six relief gaps, the relief gaps being oriented so as to extend in aligned spaced and parallel columns of three relief gaps within each column and to extend in aligned spaced and parallel rows of two relief gaps within each row, the relief gaps each being shaped so as to define a semi-circular edge extending about a portion of a periphery of the respective opening;

a second plate having a second plate first end spaced from a second plate second end, the second plate having a second plate top surface, with a matrix of cells directed into the top surface, with each cell of the matrix of cells having six cell recesses, the cell recesses being oriented so as to extend in aligned spaced and parallel columns of three cell recesses within each column and to extend in aligned spaced and parallel rows of two cell recesses within each row, the cell recesses each being shaped so as to define a circular upper edge, with each cell recess arranged for alignment with an individual one of said relief gaps such that the semi-circular edge of each relief gap is aligned with and positioned directly above a portion of an arc of the circular upper edge of a corresponding one of the cell recesses; and, a hinge mounted to the first plate first end and the second plate first end to permit pivoting of the first plate relative to the second plate, with the first plate arranged in a coextensive contiguous communication with the second plate when the first plate is in contact with the second plate in a first position, with the first plate spaced from the second plate in second position to receive a paper web therebetween and wherein said first plate first end and said second plate second end are mutually coextensive.

2. A laptop braille slate as set forth in claim 1, and further including a plurality of projections fixedly mounted to the second plate top surface, with the first plate having a first plate bottom surface, with the first plate bottom surface including a plurality of receiving sockets, with each socket of said receiving sockets arranged to receive one of said projections therewithin when the first plate and the second plate are in the first position, said projections being operable to engage and secure said web between said plates.

3. A laptop braille slate as set forth in claim 2, wherein said projections and said sockets are located proximal to said second ends of said first and second plates.

4. A laptop braille slate as set forth in claim 3, wherein said projections and said sockets are located between said second ends of said first and second plates on the one hand and said matrix of cells and said matrix of openings on the other hand.

5. A laptop braille slate as set forth in claim 2, wherein said first and second plates are of a dimension greater than eleven inches by eleven and one- half-inches such that an entire web may be secured between the first and second plates.

6. A laptop braille slate as set forth in claim 1, wherein the relief gaps are each semi-cylindrical in shape and include a semi-cylindrical interior side wall extending substantially orthogonally between upper and lower surfaces of the first plate.

* * * * *